F. S. McQUESTON.
ROTARY CUTTER.
APPLICATION FILED MAR. 7, 1917.

1,315,978.

Patented Sept. 16, 1919.

INVENTOR
BY Frank S. McQueston
Rob F. S. Harris
ATTORNEY

UNITED STATES PATENT OFFICE.

FRANK S. McQUESTON, OF WINCHENDON, MASSACHUSETTS, ASSIGNOR TO WILLIAM M. WHITNEY, OF WINCHENDON, MASSACHUSETTS.

ROTARY CUTTER.

1,315,978.      Specification of Letters Patent.      Patented Sept. 16, 1919.

Application filed March 7, 1917. Serial No. 153,144.

*To all whom it may concern:*

Be it known that I, FRANK S. MCQUESTON, a citizen of the United States, residing at Winchendon, in the county of Worcester and State of Massachusetts, have invented an Improvement in Rotary Cutters, of which the following description, in connection with the accompanying drawings, is a specification, like characters on the drawings representing like parts.

The invention to be hereinafter described relates to rotary cutters such, for example, as are used in milling machines.

Heretofore, considerable difficulty has been experienced because of the lack of means for securely, removably holding the blades of the cutter in the body thereof. These blades experience hard usage and unless they are securely held, will work loose and produce inaccurate, if not mutilated work. Different arrangements of keys have been devised for holding the blades into the body of the cutter, but experience has shown them to be unsatisfactory.

The object of the present invention is to provide simple and effective means for securely, removably holding the blades in the body of the cutter, the construction being such that, in use, the blades are not loosened, but on the contrary tend to become more securely held in position.

Figure 1:
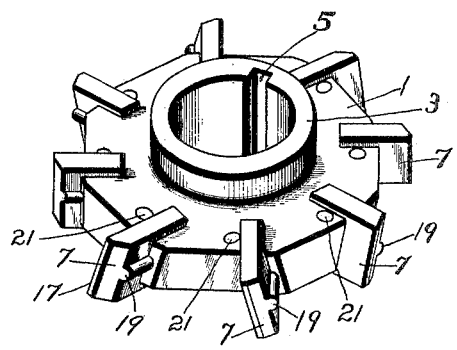

The character of the invention may be best understood by reference to the following description of one good form of the invention shown in the accompanying drawing, wherein:

Figure 1 is a perspective view of the cutter; and

Figure 2:
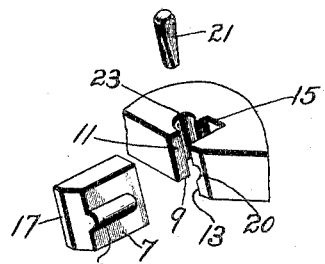

Fig. 2 in perspective, shows a cutter blade, a portion of the body of the cutter receiving said blade, and devices for securing said blade in position.

Referring to the drawing: the cutter shown therein comprises a polygonal body 1 having a hub 3 with a key slot 5 for receiving the usual key for securing the cutter to a spindle of a milling or other machine.

The body 1 is suitably formed to receive the cutting blades 7; in the present instance of the invention a series of peripheral recesses or slots 9 extend inward in a general but not truly radial direction toward the center of the body. Preferably, they are somewhat oblique to radii of the body and also oblique to the plane of the body in order that they may dispose the cutting blades at the desirable efficient cutting angle. Also, each of these slots is preferably rectangular in form presenting a front wall 11, a rear wall 13 and a base 15.

The blades 7 have their upper ends beveled and present cutting edges 17 at the forward faces thereof. These blades are somewhat longer than the depth of the slots and project substantial distances from the periphery of the body of the cutter as will be noted in Fig. 1. The blades may be substantially rhomboidal in transverse section, but are of somewhat greater width at their forward cutting edges than at their rear edges, and the side edges of the blades may project somewhat beyond the sides of the body.

Since the planes of the blades are oblique to the plane of the body of the cutter, there is a tendency in use, for them to slide in their slots transversely to the plane of said body. To prevent this movement, key and groove means is provided. In the present instance of the invention the keys are in the form of longitudinal ribs 19, preferably semi-circular in section, and projecting from and integral with the blades. These ribs are located on the rear faces of the blades and project into similarly-shaped grooves 20 in the rear walls of the blade receiving slots in the body of the cutter.

When the forward cutting edges of the blades are acting, pressure is produced on the blades which thrusts them downward and presses said ribs into said grooves. The greater burden and pressure brought to bear upon the blades, the more securely they are pressed into said gooves.

However, if the ribs were on the front faces of the blades, the cutting pressure on the latter instead of pressing the ribs more firmly into their grooves would tend to move said ribs out of secure seating engagement with said grooves, thereby permitting the blades to slide more or less transversely in their slots. Furthermore, some blades might slide more than others, thereby preventing certain of the blades from performing their share of the cutting operation. Obviously, such cutters would not only be short lived, but would produce inaccurate, poor work. These objections are overcome by the device described. Also, by locating the ribs at the rear faces of the blades, it is possible to extend their ribs out beyond the periphery of the body of the cutter to the outer ends of the blades, and thus they desirably serve to add materially to the strength of the blades.

If, however, the ribs were located at the front faces of the blades, they could not extend out to the ends of the blades as they would be in the way of the forward cutting edges of the blades.

The lower ends of the blades may seat upon the bases of the slots in the cutter body, and in use the pressure on the blades tends to hold them against said bases. Suitable means may be provided to prevent the blades from moving outward in their slots. In the present instance of the invention this means comprises tapered keys 21 having flat faces and adapted to be inserted in tapered grooves 23 extending transversely to the plane of the cutter body and communicating with the blade-receiving slots. When these keys are driven into said grooves their flat faces will engage the flat front faces of the blades and press the latter against the rear walls of said slots. These transverse keys are on the opposite sides of the blades from the longitudinal keys where they will not interfere with the latter, and will desirably serve to coöperate with the rearward pressure on said blades in use, to press and maintain the rear longitudinal keys seated in their grooves. The flat faces of the keys engaging the flat faces of the blades prevent turning of the keys and contribute to their efficient locking effect.

The construction is such that the blades are always maintained in their correct positions with no opportunity for lost motion and loosening thereof. They are long lived and can always be relied upon to produce accurate work.

When it is desired to substitute a new blade for an old one, the transverse tapered key therefor may be driven from its groove, thereby releasing the blade and permitting the same to be readily removed from its slot.

Having described one embodiment of the invention without limiting the same thereto, what is claimed is:—

1. A rotary cutter, comprising, in combination, a body provided with outwardly extending recesses having flat front and rear walls and closed at their inner ends, each recess having a groove extending longitudinally of the flat rear wall thereof, and a transversely tapering groove extending crosswise of the flat front wall thereof, flat blades mounted in said recesses, each having a flat rear surface and an integrally formed rib extending longitudinally of the flat rear wall of the blade engaging the longitudinal groove in the rear wall of the recess in which the blade is mounted, and a flat front face to engage the flat front wall of the recess, and a tapered key fitting the tapered transverse groove in the front wall of the recess for locking each cutter blade in its recess, said tapered key having a flat face to engage the front flat face of the cutter blade and acting thereagainst to force the blade against the rear wall of its holding recess and the integral rib into its groove.

2. A rotary cutter comprising a body provided with a series of recesses formed with flat front and rear walls and having longitudinal grooves in rear walls thereof, blades mounted in said recesses between the flat front and rear walls thereof and having forward cutting edges projecting out beyond the periphery of said body and longitudinal ribs integral with said blades projecting into said grooves; said body having tapered grooves extending transversely of the flat front wall of and communicating with said recesses, and tapered keys in said transversely extending grooves having flat faces engaging with the front flat faces of the said blades and pressing the rear flat face of the blades against the rear flat wall of the recesses and the integral rib into the longitudinal groove.

In testimony whereof, I have signed my name to this specification.

FRANK S. McQUESTON.